May 8, 1951      H. G. MOLINARI      2,552,108
GLASS FORMING MACHINE
Filed Dec. 4, 1947      9 Sheets-Sheet 1
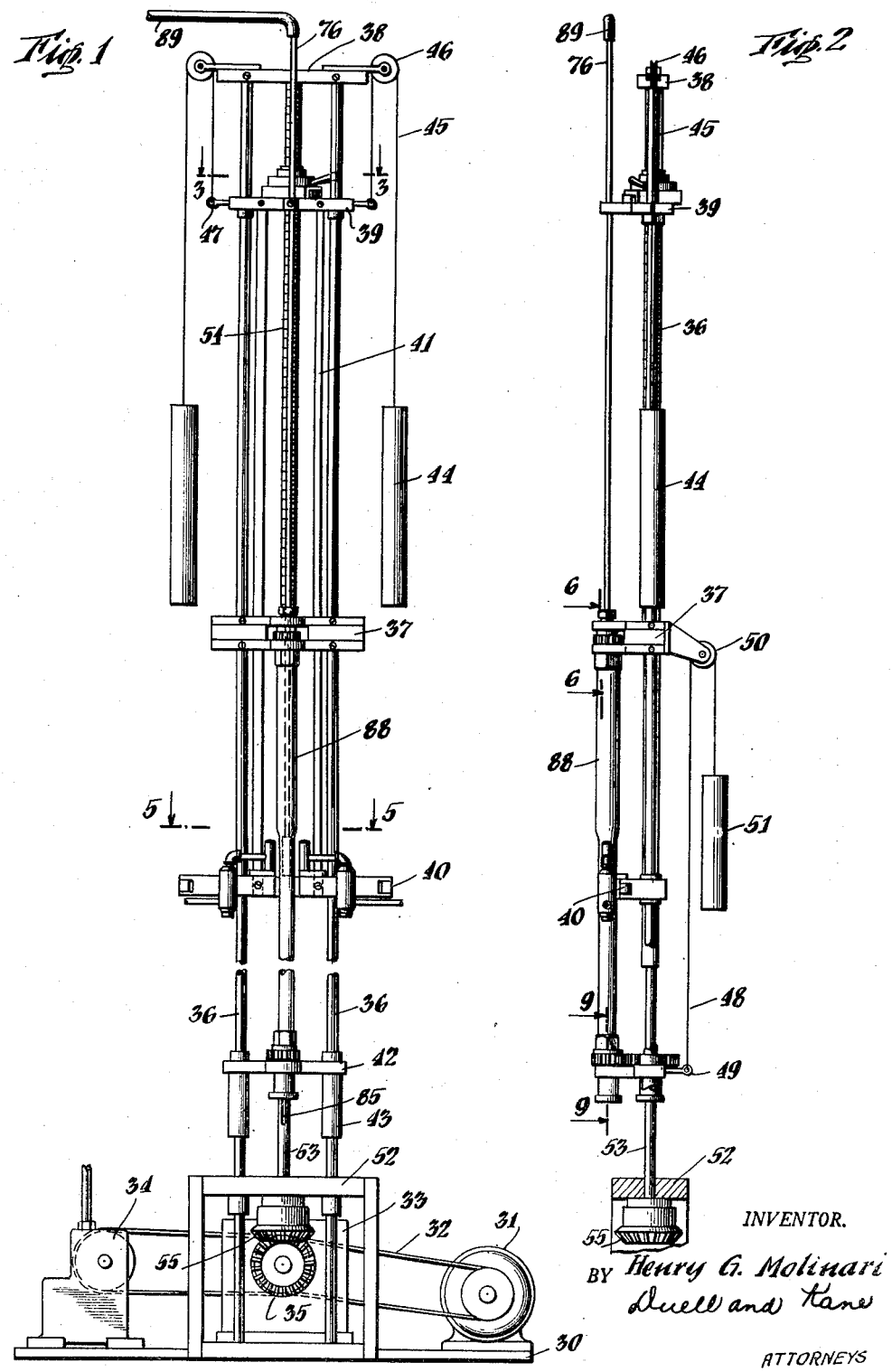
INVENTOR.
BY Henry G. Molinari
Duell and Kane
ATTORNEYS May 8, 1951 H. G. MOLINARI 2,552,108
GLASS FORMING MACHINE
Filed Dec. 4, 1947 9 Sheets-Sheet 2
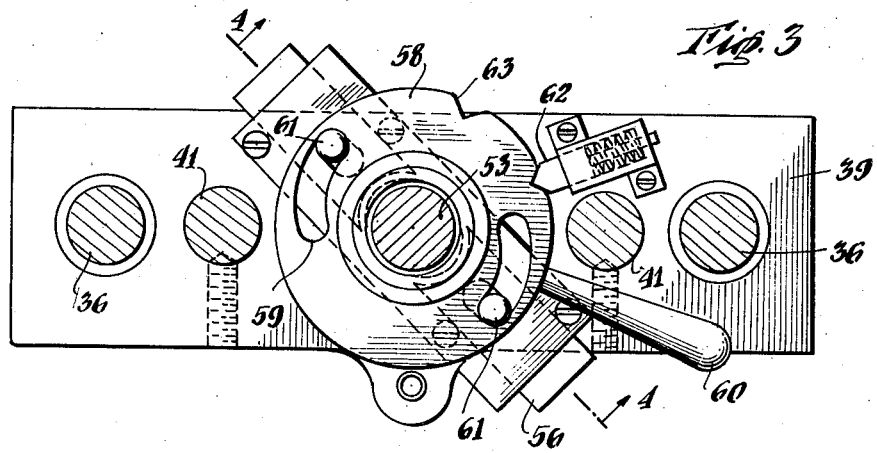
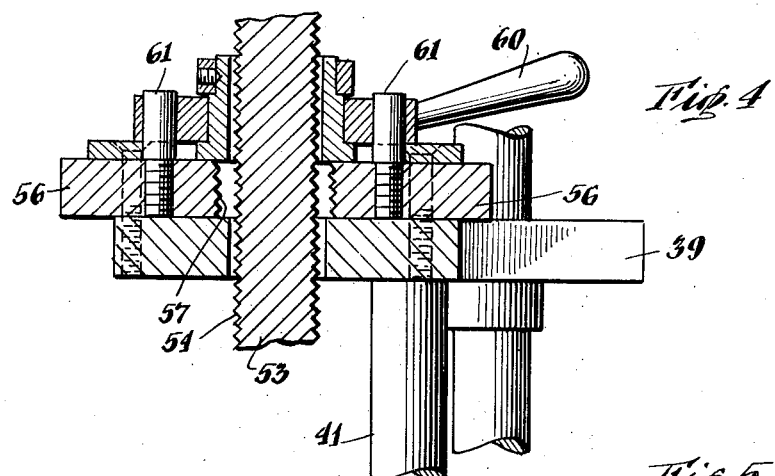
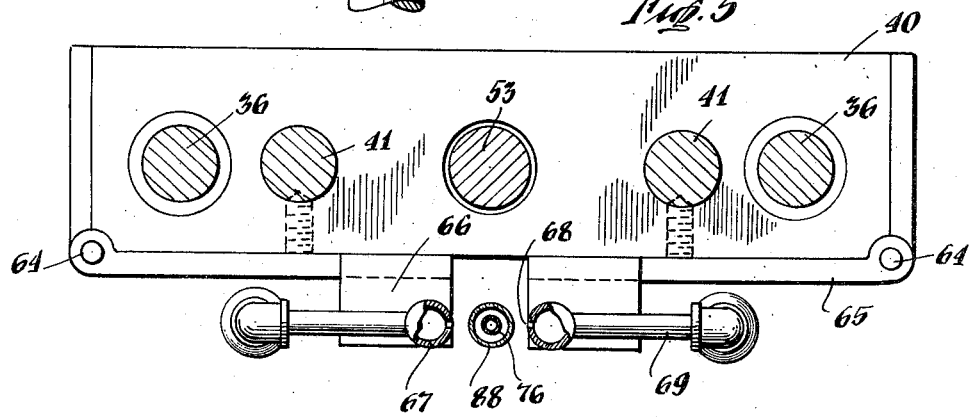
INVENTOR.
Henry G. Molinari
BY Duell and Kane
ATTORNEYS

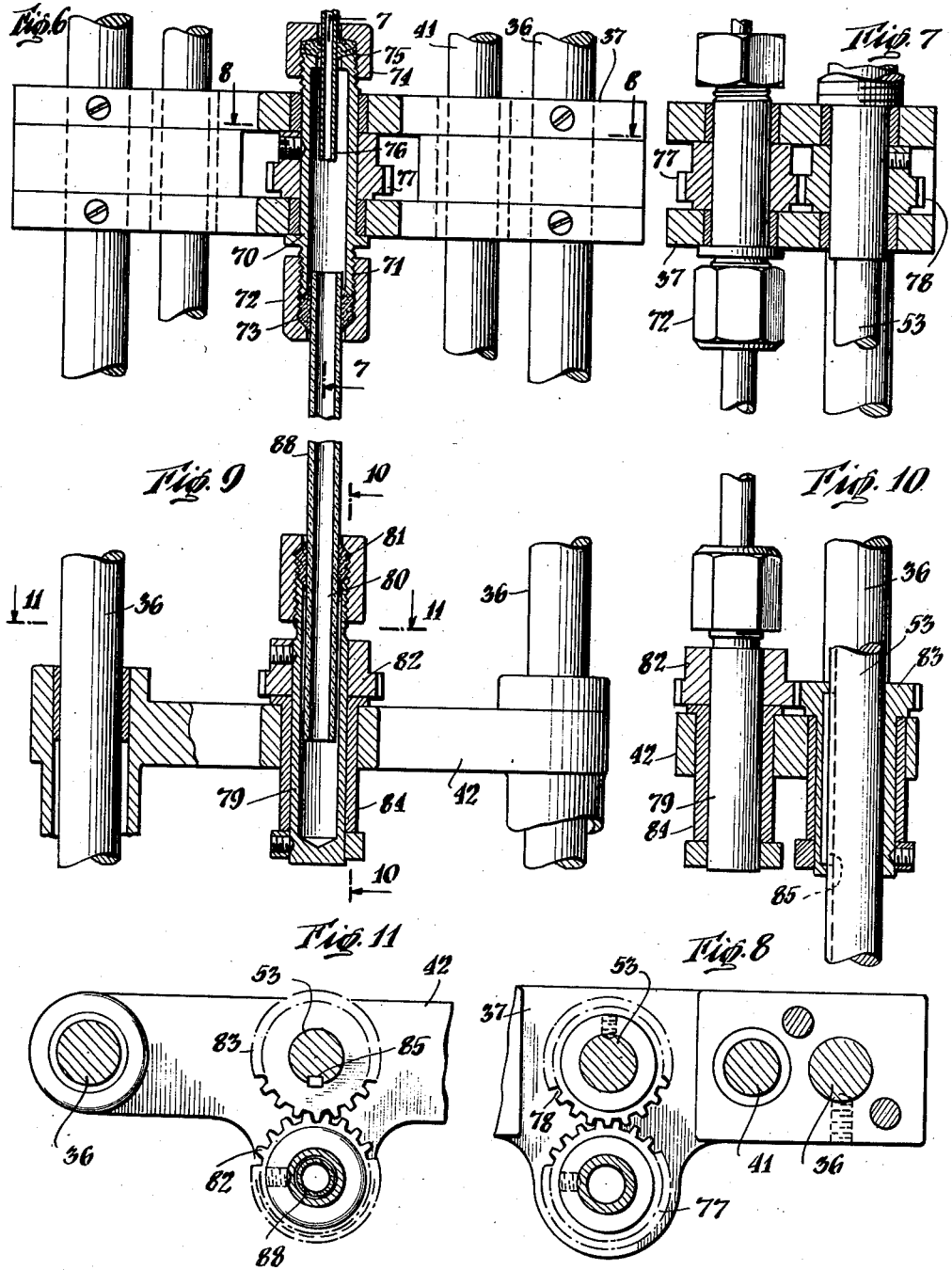

May 8, 1951 H. G. MOLINARI 2,552,108
GLASS FORMING MACHINE
Filed Dec. 4, 1947 9 Sheets-Sheet 4

INVENTOR.
Henry G. Molinari
BY Duell and Kane
ATTORNEYS

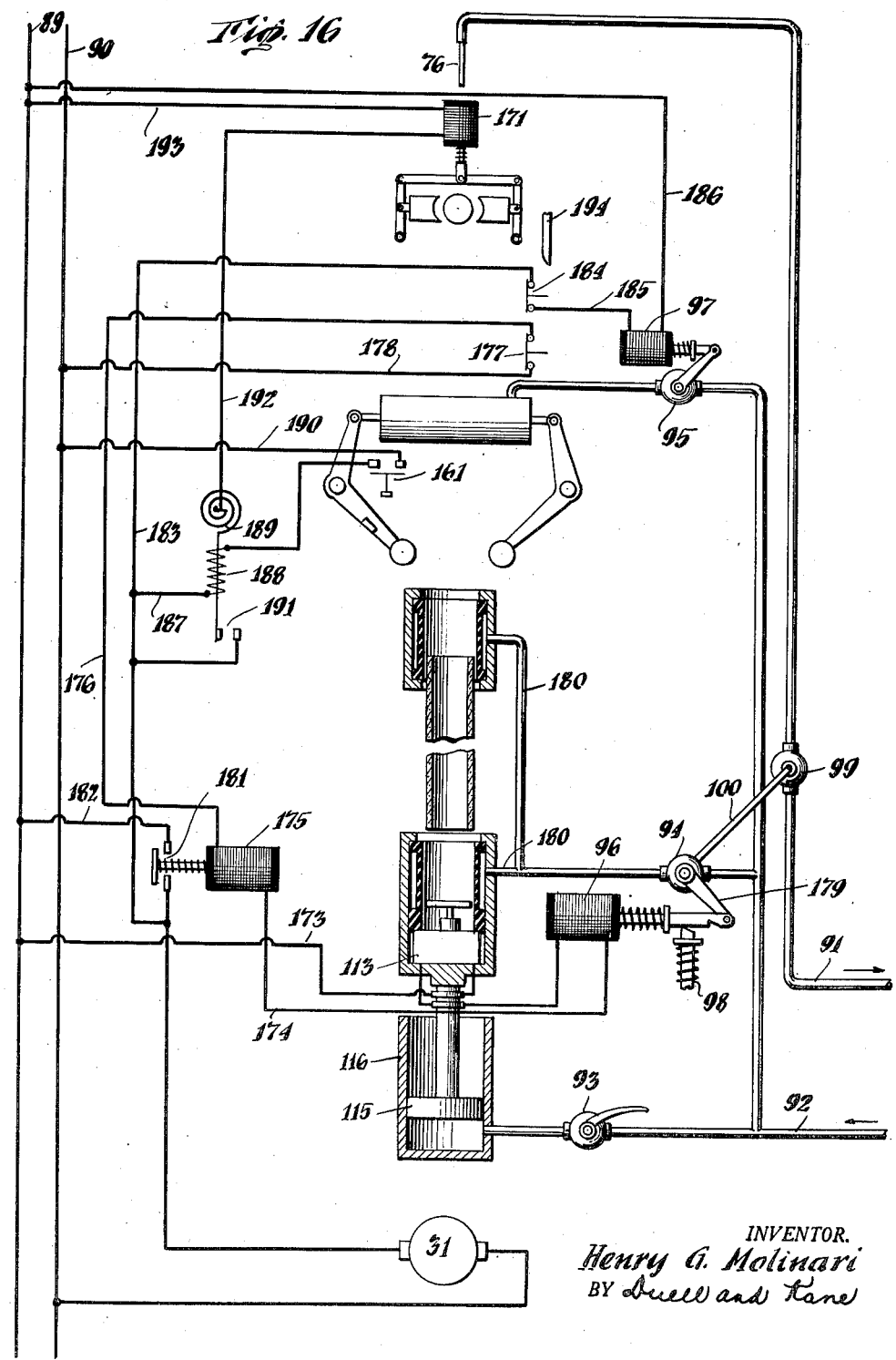

May 8, 1951 H. G. MOLINARI 2,552,108
GLASS FORMING MACHINE
Filed Dec. 4, 1947 9 Sheets-Sheet 6

INVENTOR.
Henry G. Molinari
BY Duell and Kane
ATTORNEYS

May 8, 1951  H. G. MOLINARI  2,552,108
GLASS FORMING MACHINE
Filed Dec. 4, 1947  9 Sheets-Sheet 7
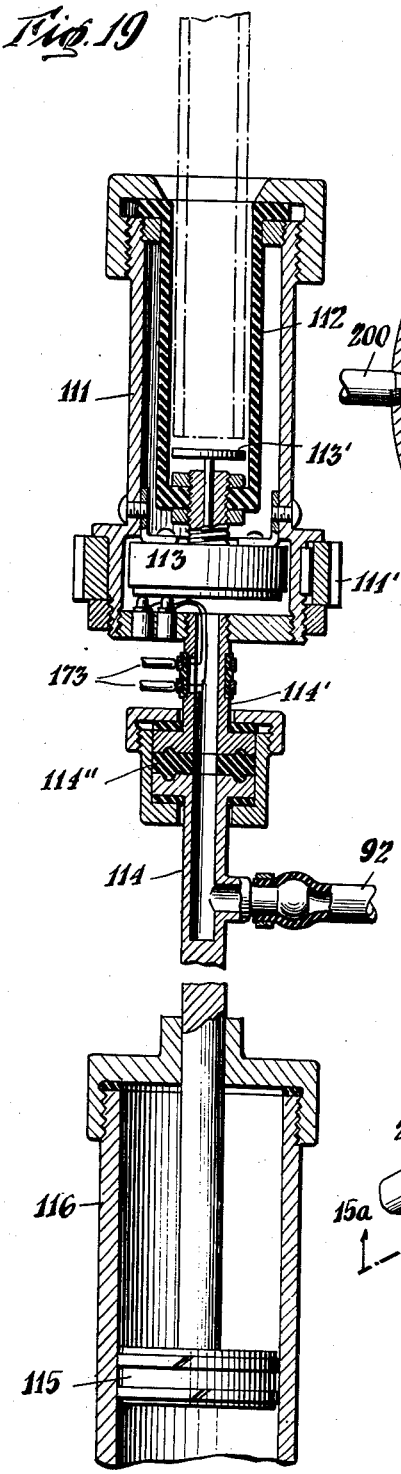
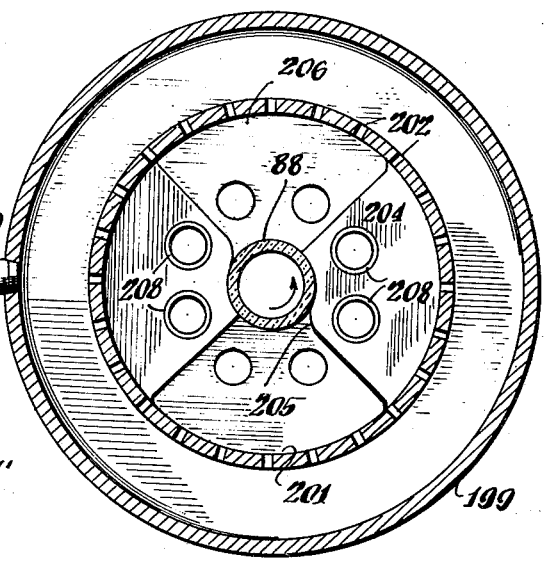
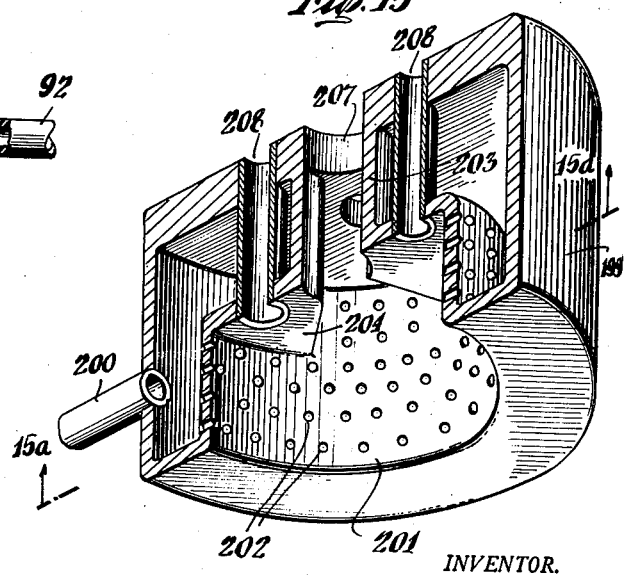
INVENTOR.
Henry G. Molinari
BY Duell and Kane
ATTORNEYS

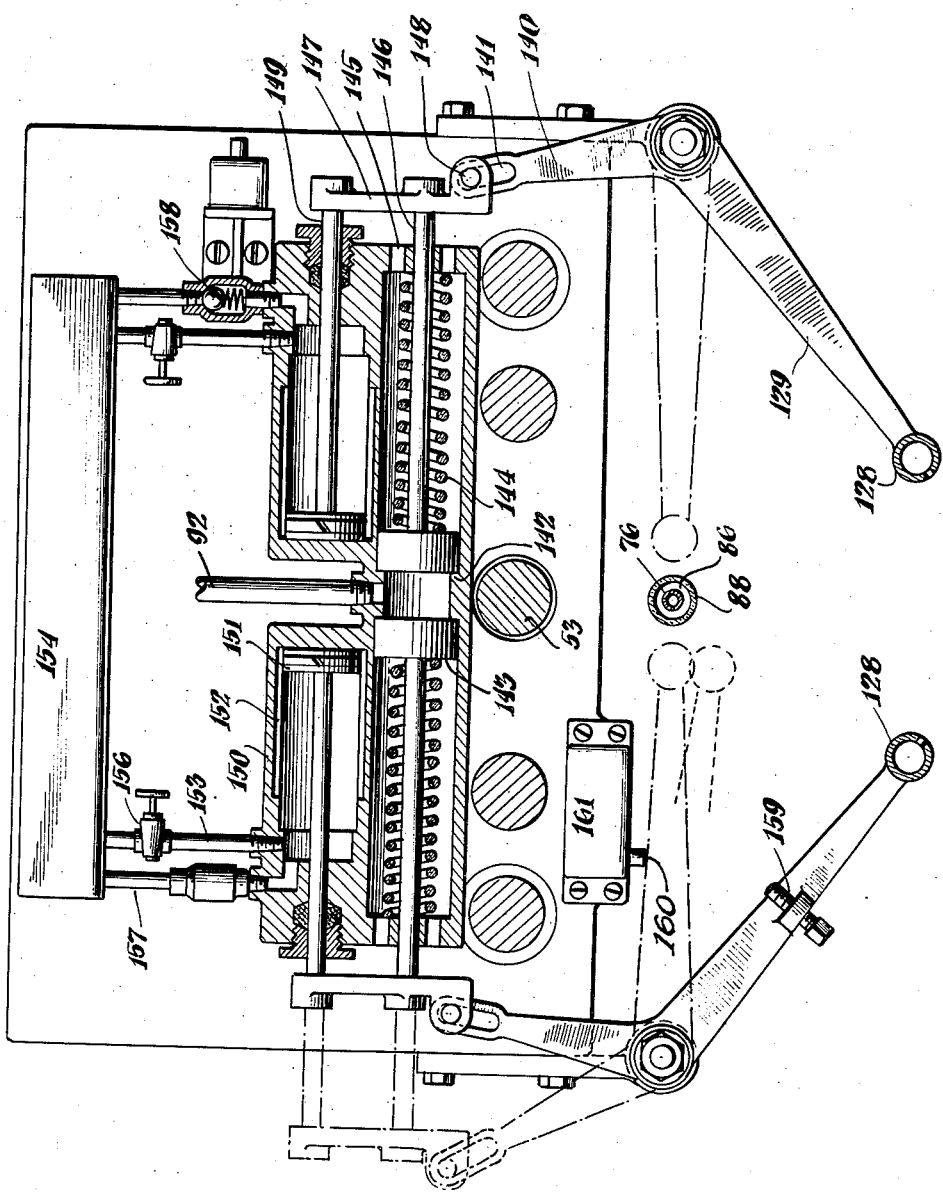

May 8, 1951 H. G. MOLINARI 2,552,108
GLASS FORMING MACHINE
Filed Dec. 4, 1947 9 Sheets-Sheet 9
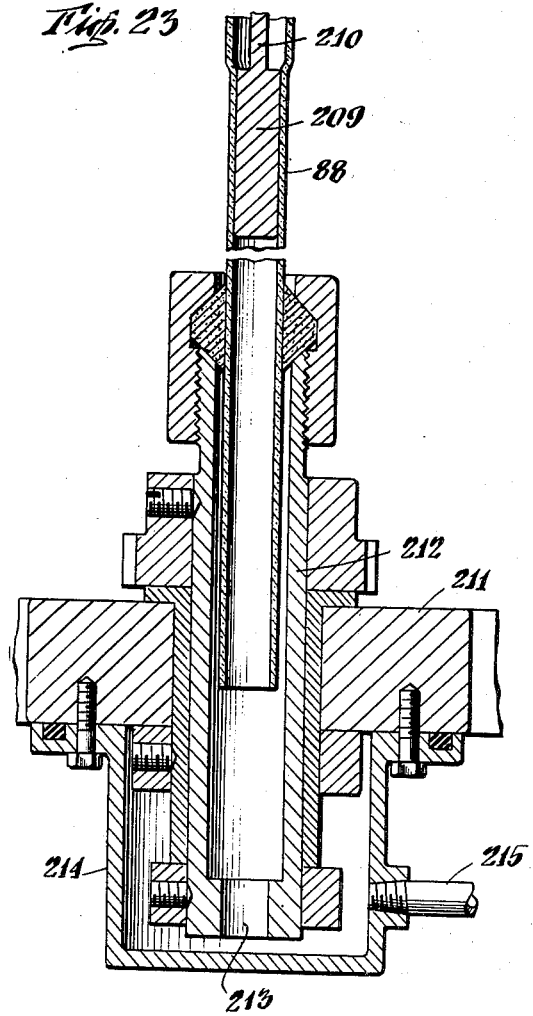
Fig. 23
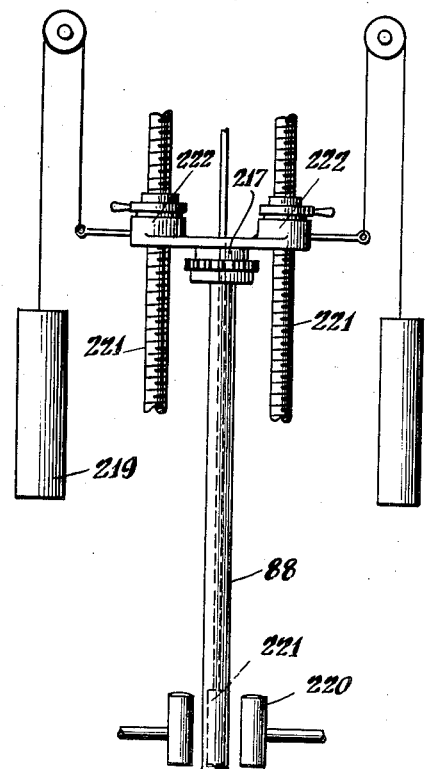
Fig. 25
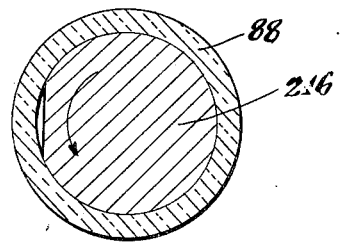
Fig. 24
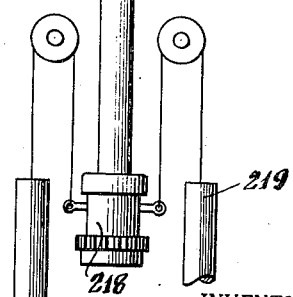
INVENTOR.
Henry G. Molinari
BY Duell and Kane
ATTORNEYS Patented May 8, 1951

2,552,108

UNITED STATES PATENT OFFICE 2,552,108

GLASS FORMING MACHINE

Henry G. Molinari, Rutherford, N. J., assignor to Becton Dickinson and Company, Rutherford, N. J., a corporation of New Jersey Application December 4, 1947, Serial No. 789,669

18 Claims. (Cl. 49—7)

This invention relates to a structurally and functionally improved machine to be employed in connection with the production of glass tubes and rods.

Where so employed, it is a primary object to produce a glass tube and also a rod which will have accurate dimensions. These dimensions will be so uniform that, the units produced by the practice of the method and by a machine constructed in accordance with the present invention, will be capable of use in virtually any desired installations where precision of dimensions is either desirable or essential. One example of such use is to be found in the case of glass barrels, and plungers for hypodermic syringe assemblies.

A further object of the invention is that of furnishing a machine which will operate at high speed and with definite economy to produce glass tubing and rods having uniform dimensions.

A still further object is that of providing a machine which may readily be operated by a relatively unskilled workman and in which the several operational steps may be practiced without difficulty and with the assurance that uniform results will obtain.

With these and other objects in mind, reference is had to the attached sheets of drawings illustrating practical embodiments of the invention and in which:

Fig. 1 is a front elevation of one form of machine;

Fig. 2 is a side elevation thereof;

Fig. 3 is a sectional plan view taken along the lines 3—3 and in the direction of the arrows as indicated in Fig. 1;

Fig. 4 is a transverse sectional view taken along the lines 4—4 and in the direction of the arrows as indicated in Fig. 3;

Fig. 5 is a sectional plan view taken along the lines 5—5 and in the direction of the arrows of Fig. 1;

Fig. 6 is a sectional front view taken along the lines 6—6 and in the direction of the arrows as indicated in Fig. 2;

Figure 22:
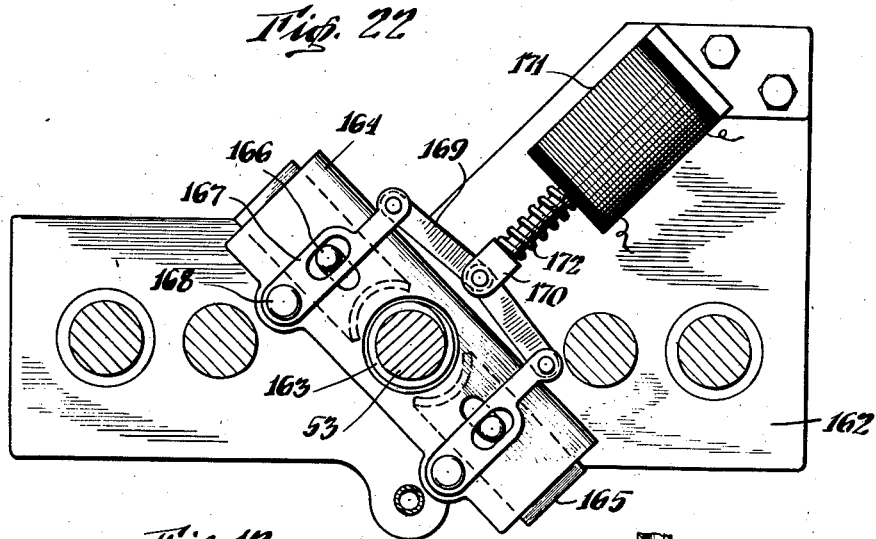
Figure 12:
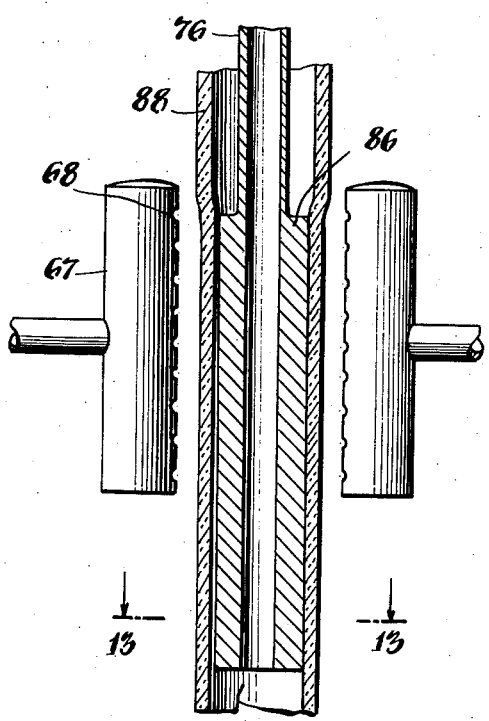
Figure 14:
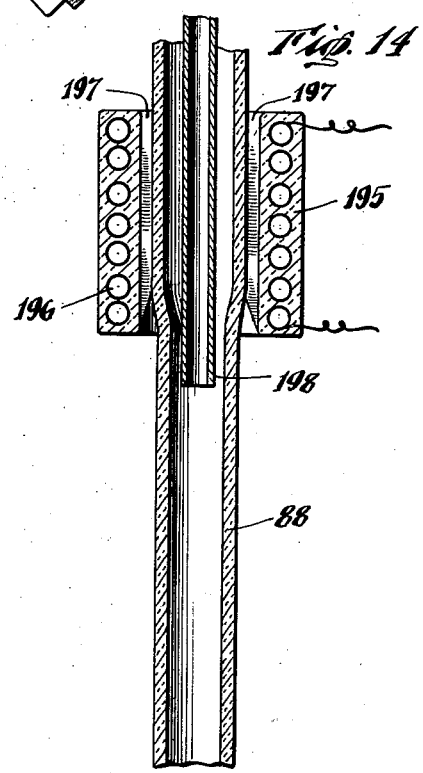
Figure 13:
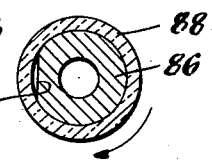
Figure 17:
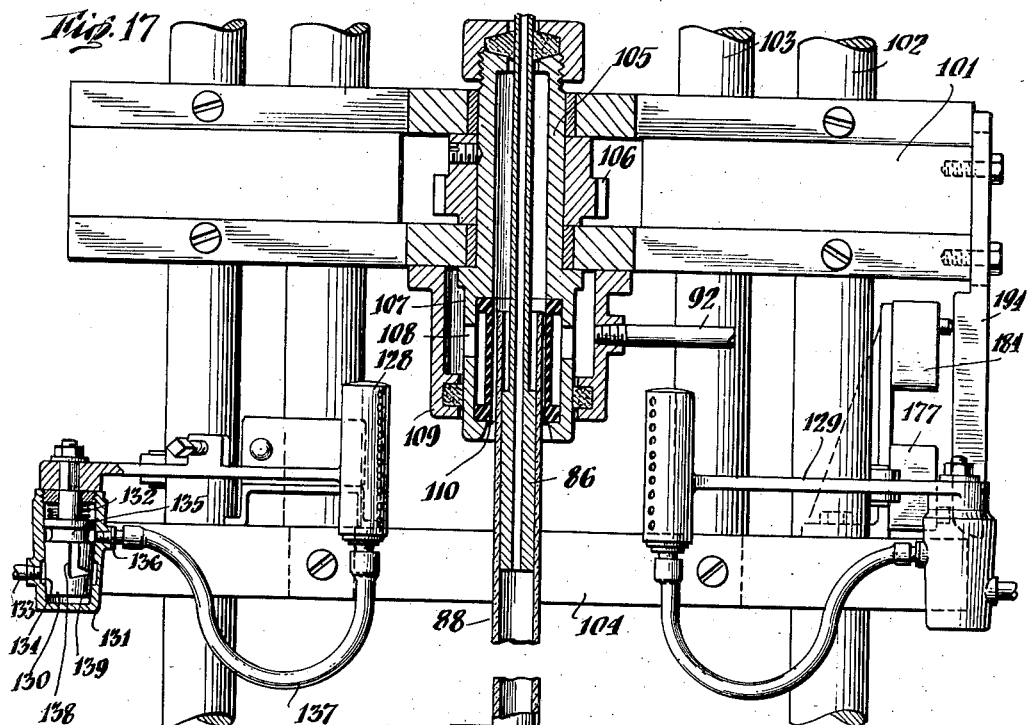
Figures 18, 20:
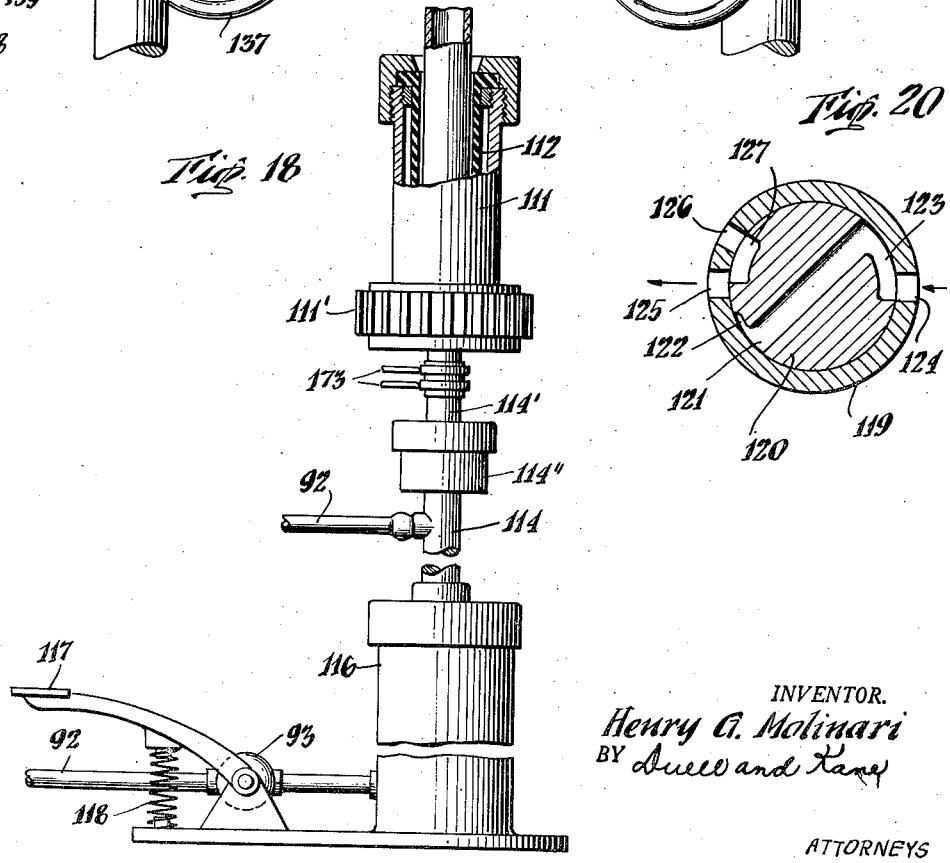

Figs. 7 and 8 are sectional views taken along the lines 7—7 and 8—8 respectively and in the direction of the arrows as indicated in Fig. 6;

Fig. 9 is a sectional front view taken along the lines 9—9 and in the direction of the arrows as indicated in Fig. 2;

Figs. 10 and 11 are sectional views taken along the lines 10—10 and 11—11 respectively and in the direction of the arrows as indicated in Fig. 9;

Fig. 12 is a somewhat enlarged fragmentary sectional view of a portion of the tube adjacent the forming station;

Fig. 13 is a transverse sectional view taken along the lines 13—13 and in the direction of the arrows as indicated in Fig. 12;

Fig. 14 is a view similar to Fig. 12 but shows the formation of an accurate outer tube surface;

Fig. 15 is a fragmentary perspective view of a former for surfacing the exterior face of a tube or rod;

Fig. 15a is a sectional view taken along the lines 15a—15a of Fig. 15;

Fig. 16 is a somewhat diagrammatic view showing the general layout of an apparatus of a substantially automatic type and which embodies the present teachings;

Fig. 17 is a partly sectional front elevation of a portion of such machine;

Fig. 18 is a similar view of the lower part of the mechanism;

Fig. 19 is an enlarged sectional view of the lower chuck;

Fig. 20 is a sectional view showing a type of valve which may be employed;

Fig. 21 is a sectional plan view of the mechanism as shown in Fig. 17;

Fig. 22 is a sectional plan view taken through an upper portion of the machine;

Fig. 23 shows, in a somewhat schematic manner, a sectional view of a lower chuck with the vacuum line connected therewith;

Fig. 24 is a sectional view, similar to Fig. 13, but illustrating a structure in which the mandrel rotates; and Fig. 25 illustrates, in a diagrammatic manner, a machine in which the tube is axially shifted during the forming operation.

Primarily referring to Figs. 1 and 2, it will be seen that the reference numeral 30 indicates the base of a machine upon which there is conveniently mounted a motor 31. The latter, by means of any suitable drive 32 serves to rotate gearing within a gear box 33. Also, the motor may drive a vacuum pump 34. The gearing within the casing 33 serves to provide a reduction drive to rotate a gear 35.

Extending upwardly from the base 30 are guides in the form of rods 36. These serve to fixedly support a main cross member 37 as well as an upper cross member 38. They should also support what might be termed a main carriage. The latter conveniently embraces an upper cross-member 39 and a lower cross-member 40. These are connected to each other by, for example, bars 41. They are slidably mounted upon the rods 36. Accordingly, the entire main carriage is reciprocable along the rods or other guides 36. The latter being disposed in a vertical plane, it follows that this carriage in its movements rises and falls.

Disposed adjacent the lower ends of the guides or tracks 36 is a lower carriage embracing a cross-member 42. Guiding of its parts is conveniently accomplished by sleeves 43 which are secured to the lower cross-member and slidably enclose the rods 36 to thus provide a stable structure. Both the upper and lower carriages are supported to such an extent that at least part of their weight is counterbalanced. Conveniently, such support in the case of the upper carriage, may take the form of weights 44 suspended from cables 45 passing over pulleys 46 disposed adjacent the upper cross-member 39. The ends of the cables are connected as indicated at 47 to the upper end of the main carriage. Preferably, the parts are so proportioned that with the aid of the counter-weights 44 or functionally equivalent structure, the carriage will remain in any position to which it has been shifted. Similarly the lower carriage may have its weight counterbalanced. To this end the ends of cables 48 are connected as at 49 to the cross-member 42. These cables pass over pulleys 50 which may be supported by the main cross-member 37. Secured to the outer ends of the cables are counterweights 51. The value of these may be such that where a machine is being employed to surface the entire face or bore of a tube, the lower carriage will have a tendency—under the action of gravity—to move downwardly.

Rotatably supported adjacent its lower end by the framework 52 extending upwardly from the base 30 is a shaft 53. This shaft has its upper end rotatably supported by the upper cross-member 38. As illustrated, it extends adjacent the cross-member 37, the lower carriage and the upper or main carriage. It is screw threaded as at 54 throughout its upper zone and to a point adjacent the cross-member 37. At its lower end it may have fixedly secured to it a gear 55. The teeth of the latter mesh with the teeth of gear 35. Thus, when the motor 31 is operating, shaft 53 will rotate.

Attention is next directed to Figs. 3 and 4 in which the cross-member 39 has been illustrated in detail. As will be seen in those views, this member slidably supports a pair of blocks 56 within supporting portions. The inner ends to these blocks are curved to conform to the exterior of shaft 53 and are screw-threaded as at 57 to have threads corresponding to the threads 54 of the shaft. These blocks may be shifted into and out of cooperating engagement with the shaft by any desired mechanism. As illustrated, the mechanism may take the form of a plate 58 having cam slots 59 formed therein. This plate may be rotated by a handle 60. Pins 61 are mounted one by each of the blocks and extend into the slots 59. A detent structure is conveniently furnished to maintain the plate and blocks in the positions to which they have been shifted. The detent may be in the form of a spring-pressed latch 62, the nose of which selectively engages one of a pair of notches 63 formed in the periphery of plate 58.

The member 39 forming a part of the main carriage, it is obvious that if blocks 56 are shifted into shaft-engaging position and with the shaft rotating, that the screw-threads 54 and 57 will cooperate to cause a shifting of the carriage along the rails or guides of the machine. The rotation of the shaft 53 being constantly in a certain direction, it is obvious that the carriage will be elevated when this engagement occurs. With the plate 58 shifted to a position where the blocks are retracted, the driving connection between the main carriage and the shaft will be broken. Accordingly, the carriage may then be freely shifted along its rails or guides.

Next referring to Fig. 5, it will be seen that a plan view of the lower carriage member has been shown. This member pivotally supports as at 64 a pair of arms 65. These arms adjacent their upper ends mount supports 66 which carry burners 67. The latter may be formed with any desirable number of nozzle apertures 68. Conveniently, only one row of these perforations is present. Extending from the burners 67 are tubes 69 which may communicate with a suitable source of gas under pressure which may, if necessary, be combined with a source of oxygen. As will be seen from Fig. 5, arms 65 may be swung to positions at which the burners are relatively remote from the cross-member 40. Alternately, those burners may be swung to positions where they are substantially in line with each other and adjacent the support or cross-member 40. In such latter position their movements are arrested by blocks 66.

Attention is next directed to Figs. 6, 7 and 8, wherein there has been shown in detail the structure adjacent and forming a part of the main cross-member 37. As will be seen in these views, a chuck is supported to extend in a downward direction. This chuck preferably includes a sleeve 70 rotatably mounted by the cross-member 37. The lower end of this sleeve is threaded as at 71 and supports upon its threads a cap 72. Interposed between the ends and axially compressible by the cooperation of the sleeve 71 and cap 72 is a layer of packing material 73 conveniently in the form of a rubber bushing. The upper end of sleeve 70 may be closed by a cap 74. A packing gland 75 may be interposed between this cap and the sleeve. This gland is perforated so that a pipe 76 may pass through the same for a purpose hereinafter brought out; it being noted that a substantially leak-proof coupling will thus exist between the outer face of the pipe and the gland.

With a view to rotating the chuck assembly so provided, a gear 77 may be secured to the outer face of sleeve 70 and encircle the same, the teeth of this gear mesh with the teeth of a gear 78. The latter is secured to shaft 53. Therefore, it is apparent that with the rotation of this main drive shaft the chuck will also rotate.

In Figs. 9, 10 and 11 the detailed mechanism associated with the lower carriage or movable cross-member 42 has been shown. Such mechanism may include a cup 79, the upper end of which mounts a cap 80 and packing 81 to provide a chuck structure. This cup has secured to it a gear 82, the teeth of which mesh with the teeth of gear 83 secured to rotate with shaft 53. The lower end of cup 79 is closed and as shown, this member may be supported within a bushing 84 which has rotative bearing with the cross-member 42. The connection between gear 83 and shaft 53 is such that axial movement of these parts with respect to each other may occur. To this end, a spline or slidable key and keyway 85 may provide the driving connection between shaft 53 and gear 83.

Reference has heretofore been made to the pipe 76 which extends through the upper chuck assembly. This pipe as indicated especially in Fig. 1, extends downwardly to a point adjacent the lower member 40 of the main carriage. At its lower end it carries a mandrel. Thus, this mandrel is disposed in the heating zone as defined by the burners 67. Attention being invited to Figs. 12 and 13, it will be observed that the mandrel has been designated by the reference numeral 86. It includes a body circular throughout the major portion of its side face but which body preferably has a flattened face 87 extending throughout its length. As illustrated in Fig. 12, the diameter of the mandrel body throughout the major portion of its circumference is approximately equal to the internal diameter which is to be embodied in the bore of a glass tube.

In using an apparatus of this nature it will be appreciated that an operator will primarily release the main carriage from driving engagement with the threads of shaft 53. That carriage will now be moved upwardly. The lower carriage comprising the cross-member 42 and its associated parts may be shifted to the uppermost position permitted by the keyway 85, or equivalent coupling. At that time or else at an earlier stage a tube 88 of glass or similar material has its upper end introduced into the upper chuck carried by cross-member 37 and its lower end introduced into the lower chuck forming a part of the lower carriage. Prior to association of the tube with the chucks, the tube bore is coated with a suitable lubricant. Due to the flat face 87 of the mandrel, the lubricant may pass to positions both above and below the mandrel. In any event, it will prevent too great a frictional contact between the forming member and the tube bore as these parts are relatively rotated.

The chucks are tightened to not alone retain the ends of the tube but also to substantially seal the lower end against air flow. The upper end of pipe 76 is connected by pipe 89 with the vaccum pump 34. It is obvious that the vacuum need not necessarily be communicated to the interior of the tube bore through the pipes 76 and 89. Rather—as hereinafter described and shown—a vacuum connection can be made with the lower chuck assembly. If—as shown—gas burners are employed, then the gas is ignited and flames of proper intensity are established. As will be understood, under these circumstances the burners 67 are disposed outwardly so that the flames will not impinge against the outer surface of the tube. Either at this time or at an earlier stage, the entire main carriage is shifted downwardly. Therefore, the burners are disposed substantially in the plane of the lower tube end and just above the lower chuck.

The motor 31 is caused to operate. This will result in shaft 53 being driven. Due to the fact that at this time no driving connection has been established between such shaft and the upper or main carriage, it follows that the latter will not be shifted. The operator will swing the arms 65 inwardly to a point at which the flames extend adjacent the lower end of the tube body. That tube in the illustrated embodiment is rotating. The mandrel within the same is stationary. This is definitely preferred in designing a machine of this type. However, it is to be understood that except where otherwise indicated in the claims, the present invention visualizes merely relative rotation of the tube with respect to the mandrel. This is true whether the mandrel is stationary and solely the tube revolves, whether the reverse occurs, or whether both parts rotate and effect relative movements of the same with respect to each other.

Gradually the burners or equivalent heating apparatus will be brought to a position at which the adjacent tube portion is subjected to the full intensity of the flame. This period should be relatively prolonged so that the tube body is adequately preheated. With proper type of glass and ordinary flame intensity, a period of approximately forty-five seconds may be allowed to elapse between the time that the flames project immediately to one side of the tube until the parts have shifted to where the flames are directed in effect in opposed relation to each other and intersecting the tube axis. If such procedure is followed there will be no substantial danger of the tube body being cracked. After this preheating period has been completed, the tube may continue to revolve for a further period of, for example forty-five seconds. This will serve to bring the tube zone, in line with the heating burners or other structure, to a plasticized condition. At that time the blocks 56 may be shifted inwardly to establish a driving connection between the shaft 53 and the main carriage. With the establishment of such a connection, that carriage will begin to rise. According to the thickness of the tube, its composition, the speed of the relative rotation, the intensity of heat, and other variable factors, the rise may be relatively rapid or slow within predetermined limits. I have found that under ordinary circumstances and with the tube rotating, for example from 50 to 100 R. P. M., a rise or elevation of the carriage of from four to eight or more inches per minute is entirely feasible.

As shown especially in Fig. 12, a tube which has not been subjected to the operations performed by the present machine should have a diameter substantially in excess of that which the finished tube is to possess. Therefore, as illustrated, the tube at a point above the mandrel 86 will have a substantially greater diameter than in the zone of that mandrel. It will be remembered that vacuum is acting within pipe 76 which communicates with the bore of the tube at a point below the mandrel. The lower end of the tube may be sealed by virtue of the packing 81 and the fact that the lower end of cup 79 is closed. Therefore, the pressure of the atmosphere acting against the outer face of the tube, while the latter is in plasticized condition, will collapse or shrink the tube. This reduction in internal diameter will be limited by the mandrel 86. Having in mind the relative rotation which is occurring between that mandrel and tube, and the film of lubricant between these parts, it follows that the flat end face 87 will act as a smoothing structure, assuring a uniformity of surfacing within the bore of the tube. With the rise of the main carriage, the heating units or burners and the mandrel will likewise rise. The tube being held against vertical movement, it follows that the entire operation will continue throughout the length of the tube and until the burners have reached a point adjacent the upper end of the tube and the upper chuck.

Incidental to the shrinkage or reduction in diameter of the tube, it is obvious that the latter will lengthen during this traversal of the carriage. It will be remembered that the lower end of the tube is associated with the cross-member 42 of the lower carriage and that the latter and the mechanism carried thereby represent a gross weight in excess of the counter-balancing effected by the weights 51 or their equivalents. Therefore, a pull of relatively slight value will be exerted on the lower end of the tube. Consequently that lower end will tend to descend; this being permitted—without interruption of driving of the lower chuck—by means of the keyway 85. It will also be understood, the higher the position of the main carriage, the greater the weight of treated tube below the zone of heating. It will also be understood that the heavier the glass, the greater should be the amount of tension. As is apparent, if tubes of thick glass are employed, they will be heavier than thin glass tubes. As is also apparent, the thicker or thinner the glass is, the greater or smaller the amount of gravitational pull which will be exerted with the machine properly disposed i. e. operating in a vertical plane. Therefore, an adequate pull or strain will be imparted to the plasticized zone of the tube. This tension results in the tube uniformly lengthening as it is treated throughout the entire length of its body. When the heaters have moved to a point adjacent the upper tube end, then they may be rendered inoperative. In the case of gas this may be achieved either by swinging arms 65 outwardly and/or by extinguishing or diminishing the flames. At that time the driving connection between shaft 53 and the carriage is terminated by, for example, shifting the handle 69 to retract the blocks 56.

However, the tube continues to rotate with respect to the mandrel; the lubricant film preventing any difficulties in this connection. During this period, the tube will cool adjacent that zone which has been heated to a degree at which there will be no danger of a "freezing" occurring between the mandrel and tube. After the elapse of a proper period, the operator may cause the motor 31 to discontinue its operations. Thereupon by opening the upper and lower chucks the ends of the tube may be freed. With the removal of the tube, the latter may be subjected to additional manipulations and operations to, for example, provide a finished syringe barrel or other complete unit. A new tube may now be inserted into the chucks and the entire operation may be repeated. For the sake of emphasizing the reduction in diameter of the tube, the showing in Figs. 1, 12 and 14 has been somewhat exaggerated.

The foregoing serves to exemplify a machine embodying the basic teachings of the present invention. As will be understood, it is extremely desirable that a machine be provided which will perform the foregoing sequence of operations without it being necessary for an operator to be constantly in attendance, or without it being necessary for that operator to be a skilled technician. A machine of a substantially automatic type has been shown in Figs. 16 to 22 inclusive of the present drawings; that machine embodying teaching such that its operation may be readily initiated and it will thereupon be unnecessary to supervise such operation. To this end the machine will receive, for example, a tube, the bore of which is to be of a certain diameter and to be uniform in a strict sense of the word. After the tube has once been associated with the machine, the attendant may initiate the operating cycle which will involve the following:

(a) Preheating of the tube throughout a given zone.

(b) The bringing of the tube to a plasticized condition.

(c) Initiation of tube treatment such that the tube bore will become uniform and of a predetermined diameter.

(d) The continuation of this forming operation throughout substantially the entire length of the tube.

(e) The termination of this forming operation at a point adjacent the upper end of the tube.

(f) The continued functioning of the parts in the absence of heat so that the tube may cool without any danger of it "freezing" to the mandrel, and (g) Thereupon, the termination of operations of the entire apparatus.

During this sequence which may—in the case of a tube of ordinary length—require from five to ten minutes, an operator can be engaged in removing finished tubes from similar machines and associating tubes to be formed with those machines, as well as initiating the cycles of the latter. Also, he may lubricate the bores of tubes which are to be rendered uniform.

Thus, referring to Fig. 16, the numerals 89 and 90 indicate leads providing a power supply. A motor has been indicated at 31 and corresponds to the motor heretofore identified. A pipe 91 may connect to a source of vacuum (not shown). This source may be supplied to a given machine as in the case of the vacuum pump 34 or a single pump may be connected to an entire battery of the machines. Air under pressure is supplied through a pipe 92. Additional valves 94 and 95 may be interposed in further branches of that line. Electro-magnets 96 and 97 control the functioning of valves 94 and 95 respectively. A latch member 98 may retain valve 94 in open position once it has been shifted to that position by energization of the magnet 96. A valve 99 is conveniently interposed in the vacuum line 91. This valve, for clarity of illustration, has been shown as a separate member rather than forming a part of the assembly of valve 94. Also, it has been shown as connected by a shaft 100 with the valve 94. Regardless of the construction employed, the function will be such that when electro-magnet 96 is energized, both valves 94 and 99 will be opened and will remain in that position until the latch 98 is released. In the event that a vacuum pump individual to each machine is employed, then valve 99 may be dispensed with.

Attention is now directed to Fig. 17 in which a cross-member 101 has been shown, that member corresponding to main cross-member 37 in the earlier views. In this figure supports 102 corresponding to the rods 36 have been shown as have also additionally bars or elements 103, corresponding to the longitudinal members 41 of the main carriage. These members 103 have secured to them adjacent their lower ends a cross-member 104 corresponding to the cross-member 40 of the earlier views. In a manner similar to that heretofore described, the main cross-member 101 rotatably supports a cylinder 105 which is driven by a gear 106 meshing with a gear secured to the main drive shaft 53. Adjacent its lower end, the cylinder 105 is enlarged as indicated at 107 and is formed with openings 108. Adjacent this zone it is enclosed by a casing 109. Connected to the latter is a branch of the air pressure pipe 92. Within this enlarged portion is a sleeve 110, preferably formed of rubber. Consequently, when air pressure is introduced through pipe 92 this sleeve will flex and constrict around any tube end enclosed within the same. As will be understood, any other and suitable chuck structure might be employed in lieu of the sleeve 110 of the upper chuck or the lower chuck hereinafter described.

In Figs. 18 and 19 where the lower chuck assembly has been shown, a collar 111 is illustrated within which a resilient sleeve or cup 112 is disposed. Preferably rigidly supported within the collar 111 is a switch 113 from which a stem extends through the base of the cup 112 and may be attached to actuator plate 113'. In this manner, the base of the cup will be supported. A gear 111' may encircle and extend from the outer face of collar 111. Below this chuck assembly there is arranged a piston rod 114 in the form of a tube having connection with a branch of line 92. This rod has connected to its lower end a piston 115 slidable within cylinder 116. The latter is connected to that branch of line 92 which is controlled by valve 93. The piston rod or tube 114 is continued in the form of a section 114' coupled to the base of collar 111. An assembly 114'' serves to provide a substantially leak-proof connection between the sections 114 and 114'. Therefore, the latter section may rotate; section 114 being retained against rotation in any desirable manner. It will be noted that ring and brush contacts may connect the switch 113 with the switch leads.

As shown, valve 93 may be operated by a pedal 117 and is normally maintained in closed position by a spring 118. In Fig. 20, the valve has been shown in detail as including a casing 119 within which a body 120 is rotatable. This body is formed with a passage 121 having a relatively reduced inner branch portion 122 and an opposite branch portion 123. The casing 119 is formed with an inlet 124 and outlets 125 and 126. The valve body 120 is also formed with a further branch passage 127. As is clear from Fig. 20, with the valve in its normal position inlet 124 is completely disconnected from outlet 125. The latter, however, through branch 127, is connected to outlet 126.

Now returning to a consideration of Fig. 17 and especially the mechanism supported by the cross-member 104, it will be seen that such mechanism includes burners 128 mounted upon arms 129, the inner ends of which may be supported by the rotatable bodies 130 of valves. Such bodies are enclosed within casings 131 and are maintained in proper position by, for example, springs 132. The casings 131 are connected by pipes 133 with a suitable source of gas mixture. These pipes may discharge into grooves 134 formed in the inner faces of the casings 131. The valve bodies 130 may be formed with main annular grooves 135 in line with the outlets 136 of the casings 131. These outlets are connected by tubes 137 with the burners 128. A vertical branch 138 is formed in each of the valve bodies and communicates with the groove 135. This vertical branch may connect with a reduced angularly extending discharge portion 139 disposed in line with the groove 134. The latter extends throughout only part of the circumference of the valve casing 131. Thus, as arms 129 are swung inwardly and outwardly they will carry with them the burners from a position remote with respect to the tube 88 to a point adjacent that tube body. Also, as they are swung they will serve to rotate valve 130 within their casings 131 to regulate the flow of fuel.

Now with a view to accomplishing such a swinging of the arms 129, attention is directed to Fig. 21. In that view it will be observed that the arms 129 form parts of bell crank levers, the second arms 140 of which extend rearwardly. These latter levers conveniently terminate in slot portions 141. A double ended air cylinder 142 is carried by support 104 and has a pair of pistons 143 mounted within it. Discharging at a point centrally between these pistons is that branch of line 92 within which valve 95 is interposed. Springs 144 act against the pistons and normally retain the latter in their innermost positions. At such positions the arms 129 are disposed in their outermost position as shown in full lines in this figure. The outer ends of cylinder 142 may be formed with openings 145 so that no air will be trapped beyond the pistons as the latter are shifted. The pistons 143 connect with rods 146 secured to brackets 147 at points beyond the cylinder. These brackets, by means of pins 148, are connected with the slots 141 of arms 104. Therefore, as pistons 143 move outwardly the arms 129 will be swung inwardly.

Also connected to the brackets 147 are the outer ends of rods 149 which extend within cylinders 150. These rods are coupled at their inner ends to pistons 151. The inner faces of the cylinders 150 may be formed with passages or grooves 152 through which liquid may flow as pistons 151 are reciprocated. These grooves 152 terminate at points short of the outer ends of the cylinders 150. Connected with such ends are pipes 153 which are coupled to a liquid reservoir 154. Within these pipes control valves 156 may be disposed. A branch line 157 may also extend between the outer ends of each of the cylinders 150 and this reservoir. Within each of these branch lines a spring-pressed check valve 158 may be interposed.

With a construction such as the foregoing it will be apparent that as air pressure is admitted through line 92, pistons 143 will project and compress springs 144. Such projection will be at a relatively rapid rate until the arms 129 have reached a position adjacent the tube 88. This will be because the grooves 152 permit a ready flow of oil from one side of pistons 151 to the other side of the same as the latter are shifted outwardly. Such shifting will occur due to the coupling between rods 146, brackets 147 and rods 149. However, when the pistons 151 once pass beyond the inner ends of grooves 152 the flow of liquid will be controlled by the valves 156. According to the amount these valves are opened, the fluid may escape at a slow or accelerated rate into the reservoir 154. The timing may conveniently be such that if the total movement of the outer ends of arms 129 is, for example, 40 degrees, these arms carrying with them the burners, may move inwardly to the position indicated in dash lines substantially instantaneously. That position will be (again for example) seven degrees removed from the final position which they assume. With such rapid inward movement the bodies 130 of the gas-controlling valves will have shifted to positions at which instead of only a minute flow of fuel occurring a substantially full flow occurs. Thus, the flames adjacent the burners will have increased from a mere "pilot light" effect to where the full flame structure is projected.

Under continuing pressure of air through valve 95, the pistons 143 will shift the pistons 151 in outward directions, to the full limit of their movement. The opening of the valves 156 and the viscosity of the liquid within cylinders 150 should be sufficient that the interval elapsing between the pistons 151 moving beyond the inner ends of grooves 152 and reaching the limit of their movement may be forty-five seconds. When the pistons 151 and 143 have thus moved to their outer limits, the flame jets will be in opposed relation, substantially aligned with each other and also aligned with the axis of tube 88, as shown in dot and dash lines. In such position the stop 159 will have engaged the actuator 160 of the switch 161 to close the latter. When air pressure is released, the pistons 143 will be returned to the position shown in Fig. 21 under the influence of springs 144. Likewise, pistons 151 will be returned to their innermost positions. Such return may be effected with maximum rapidity due to the provision of the check valves 158 or any similar expedient which allows a maximum flow of liquid from the reservoir into the cylinders 150, under the afore described movements of the pistons 151. As will be understood, with the return of arms 129 to their outer positions, the flow of gas to the burners 128 is diminished until only a "pilot light" effect exists. Of course, if desired, all flow to the burners could be interrupted; or reigniting of the gas be effected in any desired manner. Conversely, the structure of the valve body 130 might be such that the flames projected by the burners would remain substantially constant at all times.

Attention is next directed to Fig. 22 in which a cross-member 162 has been shown which corresponds to the cross-member 39 in Figs. 1–11 inclusive. In this view, there has also been indicated at 163 the threading of the shaft 53. Mounted for sliding movement within a guiding or encasing structure 164 are a pair of blocks or jaws 165 which have their inner ends curved to correspond to the radius of threads 163 and which are also threaded. These blocks may support pins 166 extending beyond the casing 164. Links 167 are pivotally supported as at 168 and have their outer ends connected to the links 169 of a toggle. The central or inner end of the latter is connected to the armature rod 170 of an electro-magnet 171; a spring 172 being provided to normally maintain the toggle in expanded condition. In such condition the inner ends of the blocks or jaws 165 will be out of operative engagement with the threads 163 of the shaft.

Considering the operation of the apparatus which has been illustrated, especially in Figs. 17 to 22 inclusive, attention is again directed to the diagram embraced in Fig. 16. It will be assumed that no tube is in the machine and that the parts of the machine are all properly connected and ready for operation. If—as is in many respects preferable—the machine is equipped with gas burners as its heating source, it will be assumed that either the "pilot light" is in operation or that the parts are otherwise designed so that as the burners move inwardly, the gas jets projected from the burners will be ignited. While in the case of Fig. 1 a separate vacuum pump could be employed, it will also be assumed that a single source of vacuum serves to create suction within the pipes 91 connected to a number, or battery of machines. Likewise, a source of air under pressure will conveniently common to a number of machines will be connected to pipe 92.

With the foregoing in mind, the lower chuck as in Fig. 18 will be in lowered position. This will be because the weight-value of this assembly will be greater than the counter-balancing effect employed. Also, as in Fig. 20, it will be seen that with the valve pedal or actuator 117 in the position shown in Fig. 18, the valve body will serve to vent any air under pressure within the cylinder 116 through the outlet 125 to the by-pass 127 and thus to the outlet 126. Therefore, the operator may insert the upper end of the lubricated tube into the upper chuck as in Fig. 17, using care that the mandrel 86 and its supporting stem 76 are introduced into the upper end of the tube 88 as the latter is so inserted. Now holding the lower end of tube 88 aligned with the lower chuck, the operator may step on the pedal 117 or otherwise shift the valve to connect the inlet 124 with the outlet 125 thereof. As is preferable, the greater the amount of throw imparted to the actuator 117, the more rapid will be the flow of air into cylinder 116. Therefore, the piston 115 and lower chuck assembly may rise at a relatively rapid rate. However, should a slower rise be desired, then, merely by throwing the actuator to a lesser extent, air will flow at a slower rate through passage 121 and branch 122 to the outlet 125 to achieve a slow elevation of the lower chuck assembly. In any event, this assembly will rise so that the lower end of the tube will be projected into the sleeve 112. With full projection of the parts, that lower tube end will strike against the actuator 113' of the switch 113 and shift the latter to closed position.

When this occurs, the circuit will be closed from lead 89 through lead 173, switch 113, magnet 96, lead 174, magnet 175, lead 176 to switch 177 and thence through lead 178 to lead 90. With such closing of the circuit and energization of magnet 96, the latter will shift actuator 179 to shift valve 94 as well as valve 99. As previously brought out, these valves, for purposes of clarity, have been shown in a schematic manner in Fig. 16. Obviously any proper valve assembly might be employed. Also, in the event that a separate vacuum pump is employed as a part of each machine, then the line 91 and valve 99 may be dispensed with. This will be because motor 31, as in Fig 1, would only be driving the vacuum pump at the time current was flowing and the motor 31 was operating.

In any event, with air under pressure free to flow past valve 94, such air will pass through branch 180 into the spaces to the rear of sleeve 110 and cup 112 of the upper and lower chucks respectively. Therefore, these sleeves will be expanded into tube-engaging relationship. As long as the air is free to thus flow, the ends of the tube may therefore not be separated from these chucks. The actuator 179 will be latched into the position at which valve 94 is maintained in open condition by latch 98. Therefore, the operator may now remove his foot from the actuator 117 and permit the valve 93 under the influence of springs 118 to assume its normal position. As has been previously brought out, this normal position permits the air within the cylinder 116 to be vented. However, the piston 115 and rod 114 will not move downwardly because of the fact that cup 112 is gripping the lower end of the tube; the upper end of such tube being supported by sleeve 110. With the parts laid out as illustrated, vacuum will exist within line 91 beyond the valve 99. Therefore, air will be exhausted through the pipe 76 and the mandrel 86 from within the interior of the tube. This is true because of the packing provided at the upper tube end as in Figs. 6 and 17 while at the lower end of the tube, the lower chuck has its base closed.

With energization of the electro-magnet 175, it is apparent that switch 181 will be closed. Therefore, current will flow from lead 90 through the motor 31, will operate to initiate rotation of the drive shaft 53. This will cause the upper and lower chucks and the interposed tube 88 to revolve.

As will be understood, the burner assembly as especially shown in Fig. 17, will be moved downwardly by the operator at the time a tube has been properly mounted between the chucks. In other words, the lower end of the main carriage will have been manually grasped and shifted to its lowermost position, where the burners 128 are disposed in a plane immediately above the lower chuck as in Fig. 18. With the energization of electro-magnet 175 and closing of switch 181, branch line 193 will be energized by current flowing through branch line 182 and switch 181. This branch line extends to switch 184 which controls current flow through a lead 185 supplying electro-magnet 97. Therefore, the current will be free to flow from that magnet through lead 186 to power lead 90. Under these circumstances, the electro-magnet 97 will be energized to shift valve 95 to open position.

With such shifting air is free to flow through line 92 into cylinder 142. As previously brought out, this will have the result that arms 129 shift rapidly inwardly up to a point slightly spaced from their limit of travel. At that point the burners will be operating and the flames will be projected immediately adjacent the side face of the tube 88. That tube will be revolving because the motor 31 is operating and gears 106 and 111' are driven by the gears associated with the drive shaft 53. However, the mandrel 86 will be stationary. Therefore, relative movement between the inner face of the tube and the mandrel will be occurring, with the film of lubricant on the inner tube face preventing undue friction. As before brought out, the timing mechanism controlling the movements of the arms 129 to their inner limit will assure that for example, forty-five seconds elapse between the time the burners are (again for example) seven degrees removed from their inner limit of movement and the time they reach their innermost station. Therefore, an ample period of preheating is provided such that the glass tube 88 will not crack. Also as afore brought out, this interval of time may be varied according to the particular design of the machine, the character of the composition of the tube, and the other variable factors involved.

However, as the arms reach their inner limit of movement, they serve to operate the switch 161 by reason of the fact that, for example, the actuator or stop 159 engages and shifts the member 160. Again returning to a consideration of Fig. 16, it will be remembered that with the energization of electro-magnet 175 and the closing of switch 181 current is free to flow from lead 89 through lead 182 to lead 183. Thence, it will flow through branch lead 187 and a timing mechanism which may take the form of a heating element 188 associated with a bi-metallic strip of a thermostat 189. With switch 161 closed, the current will therefore flow from this heater through lead 190 and so to power lead 90 to complete the circuit. The thermostatic element 189 carries a contact forming a part of switch 191. This contact is connected by a lead 192 to electro-magnet 171. Extending from the latter is a lead 193 connected to power lead 90. The second contact of switch 191 is connected to lead 183 which, as previously brought out, connects through switch 181 to lead 182 and power lead 89. According to the value of the heater 188, the bi-metallic strip 189 and the spacing of the contacts of switch 191, a greater or lesser interval of time will elapse after the heater has been energized until contacts of the switch 191 are closed. If an interval, for example forty-five seconds, is desired then the parts may be adjusted to effect such a result.

It will be borne in mind that, a period of preheating has been occurring as the burners moved inwardly through their last stages of shifting. Therefore, subject to the adjustment of the actuating mechanism for switch 191, a continued operation of the parts under the same circumstances will occur for a period adequate to provide for a plasticizing of the tube 88. At the end of that period it is obvious that due to the closing of switch 191, electro-magnet 171 is energized. When this occurs, the blocks or jaws 165, as in Fig. 22, move inwardly so that they engage with the threads 163 of shaft 53. As soon as this is accomplished, there is a definite coupling between this shaft and the main carriage. Therefore, the latter begins to ascend. In such movement, a corresponding rising of the burners and mandrel will occur. This will continue throughout substantially the entire length of tube 88 so that the bore of the latter will be rendered properly uniform.

Returning to a consideration of Fig. 17, it will be observed that switches 177 and 184 are mounted by, for example, the inner cross-member of the main carriage. A cam 194 is disposed adjacent the actuators of these switches and may be secured to the fixed cross-member 101. Therefore, it is apparent that as the main carriage rises to a point adjacent its upper limit of movement, switches 184 and 177 will be successively operated. Such operation will not occur until the mandrel reaches a point, for example, two inches below its upper limit of operative co-action with the tube 88.

Now returning to Fig. 16, it will be understood that as the actuator of switch 184 is operated by cam 194, that switch will be opened. Therefore, the circuit through electro-magnet 97 will be interrupted. Accordingly, valve 95 will close and the air will no longer flow from line 92 into cylinder 142. It is therefore apparent that arms 129, under the action of springs 144, will shift outwardly to remove the burners 128 from cooperative association with the upper tube end. If the flow of gas to these burners is controlled as afore indicated, then simultaneously with the outward swinging of the arms the flames will be diminished in that—for example—only a "pilot light" remains. In any event, the upper end of the tube is no longer being subjected to the action of heat. However, the tube continues to revolve with respect to the mandrel. Therefore, that portion of the tube which remains in a plastic condition will not adhere to the mandrel. Rather, the upper zone of the tube will now begin to cool and harden.

It is to be remembered that magnet 171 is, under these circumstances, still energized. Therefore, the carriage is still operatively coupled to the main drive shaft and will continue to rise carrying with it the mandrel. Such rise will be terminated when the actuator of switch 177 is operated by the cam 194. More particularly, with the opening of this switch current flow through electro-magnet 175 will be interrupted. This will cause first a stoppage of the motor 31, second current will no longer flow through heater 188. Therefore, the contacts of switch 191 will open. Third, current flow from electro-magnet 171 will immediately cease because switch 181 is open. Accordingly, all operative parts of the machine will be brought to a stop excepting only the gripping action of the chucks on the tube. Therefore the operator may—as soon as convenient—observe that the forming operation on the gripped tube has been completed. By operating the latch 98, he may then effect a closing of valves 94 and 99. It is to be remembered that if a separate vacuum pump is employed for each machine, the latter have ceased to operate when motor 31 stopped. Otherwise, the closing of the valve 99 will disconnect the pipe 76 and the mandrel from the vacuum source. With air pressure no longer flowing through branch lines 180 connected to line 92, the chucks will move out of contact with the tube ends. It will be understood that valves 94 and 95 may be constructed in a manner similar to valve 93, so that the operator may be assured of a ready venting of the pressure in line 181. The operator may now grasp the tube and with the lower chuck assembly more than counter-balancing the value of the weights, that assembly will tend to move downwardly. If such counter-balancing value does not exist, then the operator may deliberately shift the lower chuck assembly to thus free the tube. With the removal of the latter, a new tube may be disposed between the upper and lower chucks. At the same time the operator will manually or otherwise have shifted the main carriage downwardly so that the burner assembly is disposed at a point adjacent the lower chuck. Incident to such shifting, it is apparent that the cam 194 will have moved out of operative association with the actuator of switches 184 and 177 so that they may return to their normal closed positions.

In Fig. 14 there has been indicated at 195 a heater body having coils 196. This may be employed in lieu of the burners heretofore described. The heater may comprise a radiant high intensity coil or may, for example, involve a structure in which an induction field creates a high temperature. Incidentally, there has been shown in this view a structure by means of which the exterior face of the tube 88 is formed so that it is uniform. To this end the heater 195 may be in the nature of a sleeve providing a former. This is concentrically disposed with respect to the tube. The inner face of the former may be formed with a pair of grooves 197 corresponding in function to the flat end face 87 of the mandrel 86. A pipe 198 may extend within tube 88 and serve to supply air, or a suitable gas under pressure.

With the tube and former capable of relative rotation and the heater 195 being a part of the former, it is apparent that as afore brought out, an apparatus serving to not alone effect the desired relative rotation between the former and tube, but also to shift the same axially with respect to each other, will serve to cause a traversal of the tube through the former. With the tube being in plasticized condition, it is apparent that the pressure transmitted internally to the tube by the pipe 198 will serve to expand the outer face of the tube into proper cooperating contact with the former. Therefore, the outer face of the tube will be caused to become uniform throughout its entire length and correspond precisely to the dimension incorporated in the former bore.

Under certain circumstances, some difficulties may be experienced if the heater is incorporated in the former as illustrated in Fig. 14. An alternative structure has been generally illustrated in Figs. 15 and 15a. In these views it will be seen that the former may include a hollow body 199 to which a pipe 200 is connected so that a suitable gas mixture may flow into the interior of the body. The lower end of the body may be enlarged as indicated at 201 and formed with any suitable number of perforations 202 providing burner jets. Conveniently, the upper portion of the body is reduced as at 203 to provide arcuate forming faces 204 for contact with the tube. As illustrated, the leading edges 205 of these arcuate faces may be flared to provide what might be termed an entrance portion. Intervening the arcuate faces 204 are chamber portions 206, the walls of which are also formed with perforations 202 to provide burner jets. Thus, in this zone of the formed body, the tube will be engaged by the arcuate faces at diametrically opposed points throughout substantially two 90° zones. Intervening these zones will again be substantially 90° faces of the tube or rod throughout which latter zones, flames will be impinging upon its exterior surface. Adjacent its upper end, the former body may terminate in a circular forming portion 207 which completely encloses the tube at that point.

In this connection, it will be understood that the lower end of the former as shown in Fig. 15, will provide for the preheating of the tube or rod as well as the plasticizing of the same. If auxiliary burners in advance of the former body are desirable, then such units may be employed. In any event, sufficient treatment period will have elapsed prior to the tube being engaged by the exterior arcuate forming faces 204 so that the tube will be in proper plastic condition. This condition will be maintained—incident for example to the burner jets in chambers 206—throughout the upper zone of the former. Accordingly, the portion 207 will act as a final forming member serving to assure that the exterior face of the rod or tube emerging from the former will have completely uniform dimensions. Also as shown, if desired, pipes 208 may extend through the upper portion of the body 199 so as to permit products of combustion to escape.

Under certain conditions it may be desired to provide for vacuum or pressure within the tube without the necessity of having, for example a pipe 76, a pipe 198 or a bored mandrel 86. Rather as shown in Fig. 23, the mandrel 209 might be solid and supported by a rod 210. In such case, the cross-member 211 forming a part of the lower carriage would support the rotatable chuck assembly generally indicated at 212. The lower end of this assembly would be formed with a passage 213 and could conveniently be enclosed by a casing 214. A tube 215 would connect with the enclosure 214 and be coupled to a suitable source of suction. Under these circumstances it is apparent that vacuum would be transmitted from the interior of the enclosures 214 through opening 213 through the bore of tube 88. Obviously if a formation of the exterior surface of a rod or tube were involved, then no mandrel 209 would be disposed within the tube bore. Also, pipe 215 instead of being connected to a source of vacuum would be coupled for example to a source of air pressure.

As previously brought out, while it is in many instances preferred to have the mandrel non-rotating and the tube 88 rotating, a different condition might exist. This has been shown in Fig. 24 in which the mandrel has been indicated at 216. Also, as indicated, this mandrel has been shown as rotating. Under these circumstances, the tube 88 might either be stationary or rotate in a manner such that relative rotation between the tube and the mandrel or former would be occurring.

Finally, as also previously brought out, it is in most instances preferred that in accordance with the present teachings the tube or rod being operated upon should not be capable of axial movement. Rather, while it was being rotated, the mandrel or former and the tube heating assembly would be shifting axially of the tube. Except where otherwise indicated in the claims, however, it is to be understood that the tube might be axially shifted with either the rotating or stationary mandrel and heaters remaining in the same horizontal plane. This has been illustrated in Fig. 25 in which the reference numeral 88 again indicates the tube. The ends of this tube are supported by an upper chuck 217 and a lower chuck 218. These chucks and the parts generally providing upper and lower carriages may be counter-balanced as indicated at 219. Again the values incorporated in the counter-balances may be proportioned in accordance with the operations to be performed. In any event, the burner 220 and if as shown a mandrel 221 is employed, these assemblies will normally remain in the same horizontal plane. A screw-threaded shaft or shafts 221 may cooperate with engaging assemblies 222 forming parts of the upper carriage so that the latter may be positively shifted. With the elevation of this carriage, it is apparent that the tube will be axially shifted; the operation of the parts being otherwise similar to that heretofore described.

Thus, among others, the several objects of the invention as afore noted are achieved. It is to be understood in the following claims that except where otherwise indicated, the word "tube" will be employed to designate either a hollow bored member or a rod element which is to be operated upon. Also, it will be apparent that numerous changes in construction and rearrangement of the parts might be resorted to without departing from the spirit of the invention as defined by the claims.

What I claim is:

1. A forming machine including a pair of spaced elements for supporting a substantially vertically extending tube between them, a tube forming element, guiding means for at least one of said elements, driving means for causing said pair of elements and said forming element to rotate with respect to each other and to move at least one of said elements in a direction parallel to the tube axis, means disposed adjacent said forming element for heating and plasticizing said tube, the lower supporting element of said pair acting to support the lower tube end in a condition of tension such that said tube adjacent its zone of plasticity, and under the action of gravity, will be assisted in changing its dimensions to conform to those of said forming element.

2. A forming machine including a pair of spaced elements for supporting a substantially vertically extending tube between them, a tube forming element, guiding means for at least one of said elements, driving means for causing said pair of elements and said forming element to rotate with respect to each other and to move at least one of said elements in a direction parallel to the tube axis, means disposed adjacent said forming element for heating and plasticizing said tube, the lower supporting element of said pair acting to support the lower tube end in a condition of tension such that said tube adjacent its zone of plasticity, and under the action of gravity, will be assisted in changing its dimensions to conform to those of said forming element and means for creating a differential of pressure within the tube bore to further assist in changing the dimensions of said tube.

3. A forming machine including means for rotatably supporting the upper end of a tube against displacement in a vertical plane, means for rotatably supporting the lower end of such tube, guiding means whereby said last named means and the lower tube end may shift in a vertical plane, heating means disposed adjacent said tube and mounted for movement in a direction substantially parallel to the axis of the same and a forming member cooperable with said tube and also axially movable with respect thereto.

4. A forming machine including means for rotatably supporting the upper end of a tube against displacement in a vertical plane, means for rotatably supporting the lower end of such tube, guiding means whereby said last named means and the lower tube end may shift in a vertical plane, heating means disposed adjacent said tube and mounted for movement in a direction substantially parallel to the axis of the same, a forming member cooperable with said tube and also axially movable with respect thereto, means for supporting said member against rotation and means for creating a partial vacuum within the bore of said tube.

5. A forming machine including guide means, a carriage shiftable along said guide means, means extending adjacent said carriage for driving the same, clutch means for coupling said carriage with said driving means, tube heating means supported by said carriage, a fixed support, a movable support, means associated with said supports whereby the ends of a tube may be gripped to rotate a tube between said supports and tube forming means extending into the zone of said heating means and connected to said carriage.

6. A forming machine including in combination means for rotatably supporting a tube end, mounting means preventing a shifting of said supporting means in a direction axially of said tube, a mandrel to be disposed within the bore of said tube, means arranged substantially in line with said mandrel for applying heat to the tube exterior, means supporting said mandrel and heat-applying means to shift in a direction parallel to the tube axis and means for causing such shifting.

7. A forming machine including in combination means for rotatably supporting a tube end, mounting means preventing a shifting of said supporting means in a direction axially of said tube, a mandrel to be disposed within the bore of said tube, means arranged substantially in line with said mandrel for applying heat to the tube exterior, means supporting said mandrel and heat-applying means to shift in a direction parallel to the tube axis, means for causing such shifting and further means for rotatably supporting the opposite end of said tube for movement in the direction of its axis.

8. A forming machine including in combination means for rotatably supporting a tube end, mounting means preventing a shifting of said supporting means in a direction axially of said tube, a mandrel to be disposed within the bore of said tube, means arranged substantially in line with said mandrel for applying heat to the tube exterior, means supporting said mandrel and heat-applying means to shift in a direction parallel to the tube axis, means for causing such shifting and means whereby the interior of said tube in the zone of said mandrel will be subjected to the action of vacuum.

9. A forming machine including in combination means for rotatably supporting a tube end, mounting means preventing a shifting of said supporting means in a direction axially of said tube, a mandrel to be disposed within the bore of said tube, means arranged substantially in line with said mandrel for applying heat to the tube exterior, means supporting said mandrel and heat-applying means to shift in a direction parallel to the tube axis, means for causing such shifting, means whereby the interior of said tube in the zone of said mandrel will be subjected to the action of vacuum, further means for rotatably supporting the opposite end of said tube for movement in the direction of its axis and means associated with said further means whereby the entrance of air into the adjacent tube end is prevented.

10. A forming machine including in combination means for rotatably supporting a tube end, mounting means preventing a shifting of said supporting means in a direction axially of said tube, a mandrel to be disposed within the bore of said tube, means for applying heat to the tube exterior, means for movably supporting said heating means whereby in the zone of said mandrel the tube may initially be preheated and thereupon be subjected to plasticizing heat, means supporting said mandrel and the supporting means for said heat-applying means whereby they may shift in a direction parallel to the tube axis and means for causing such shifting.

11. A forming machine including in combination guides, a carriage mounted for movement on said guides, means for causing such movement of said carriage, a mandrel to be disposed within the bore of a tube, heating means to act in the zone of said mandrel against the exterior of such tube, means for connecting said heating means and mandrel to said carriage whereby they may shift in the direction of the tube axis and means for supporting a tube within the zone traversed by said heating means and mandrel.

12. A forming machine including in combination guides, a carriage mounted for movement on said guides, means for causing such movement of said carriage, a mandrel to be disposed within the bore of a tube, heating means to act in the zone of said mandrel against the exterior of such tube, means for connecting said heating means and mandrel to said carriage whereby they may shift in the direction of the tube axis, means for supporting a tube within the zone traversed by said heating means and mandrel and means for disconnecting said carriage from its moving means.

13. A forming machine including in combination guides, a carriage mounted for movement on said guides, means for causing such movement of said carriage, a mandrel to be disposed within the bore of a tube, heating means to act in the zone of said mandrel against the exterior of such tube, means for connecting said heating means and mandrel to said carriage whereby they may shift in the direction of the tube axis, means for connection with one tube end for rotatably supporting the same against movement in a direction parallel to its axis and means for supporting the opposite end of said tube.

14. A forming machine including in combination guides, a carriage mounted for movement on said guides, means for causing such movement of said carriage, a mandrel to be disposed within the bore of a tube, heating means to act in the zone of said mandrel against the exterior of such tube, means for connecting said heating means and mandrel to said carriage whereby they may shift in the direction of the tube axis, means for connection with one tube end for rotatably supporting the same against movement in a direction parallel to its axis and in a non-horizontal position and means for supporting the opposite tube end for movement parallel to such axis.

15. A forming machine including in combination guides, a carriage mounted for movement on said guides, means for causing such movement of said carriage, a mandrel to be disposed within the bore of a tube, heating means to act in the zone of said mandrel against the exterior of such tube, means for connecting said heating means and mandrel to said carriage whereby they may shift in the direction of the tube axis, means for connection with one tube end for rotatably supporting the same against movement in a direction parallel to its axis and in a non-horizontal position, means for supporting the opposite tube end for movement parallel to such axis and means forming a part of said last named supporting means whereby under the action of gravity said tube may lengthen.

16. A forming machine including in combination guides, a carriage mounted for movement on said guides, means for causing such movement of said carriage, a mandrel to be disposed within the bore of a tube, heating means to act in the zone of said mandrel against the exterior of such tube, means for connecting said heating means and mandrel to said carriage whereby they may shift in the direction of the tube axis, means for connection with one tube end for rotatably supporting the same against movement in a direction parallel to its axis and in a non-horizontal position, means for supporting the opposite tube end for movement parallel to such axis, means forming a part of said last named supporting means whereby under the action of gravity said tube may lengthen and means for counterbalancing the movements of said carriage.

17. A forming machine including in combination an upper and lower chuck to support between them a tube, a carriage mounted for movement in the zone of said tube and in a direction parallel to the axis of the latter, a mandrel for cooperation with the bore of the tube and supported to move with said carriage, a burner movably mounted by said carriage to shift into preheating and plasticizing positions with respect to said tube and adjacent said mandrel, means responsive to a positioning of a tube between said chucks for causing said burner to shift to its preheating and thereafter its plasticizing position, means for rotating said chucks, means for moving said carriage and means responsive to said carriage reaching a pre-determined position for rendering said burner inoperative to further heat said tube.

18. A forming machine including in combination an upper and lower chuck to support between them a tube, a carriage mounted for movement in the zone of said tube and in a direction parallel to the axis of the latter, a mandrel for cooperation with the bore of the tube and supported to move with said carriage, a burner movably mounted by said carriage to shift into preheating and plasticizing positions with respect to said tube and adjacent said mandrel, means responsive to a positioning of a tube between said chucks for causing said burner to shift to its preheating and thereafter its plasticizing position, means for rotating said chucks, means for moving said carriage, means acting through one of said chucks and mandrel to cause the interior of the tube to be subjected to a sub-atmospheric pressure and means responsive to said carriage reaching a pre-determined position for rendering said burner inoperative to further heat said tube.

HENRY G. MOLINARI.

REFERENCES CITED

The following references are of record in the file of this patent:

UNITED STATES PATENTS

| Number    | Name     | Date          |
|-----------|----------|---------------|
| 1,301,714 | Kueppers | Apr. 22, 1919 |
| 2,209,739 | Meyer    | July 30, 1940 |
| 2,368,169 | Smith    | Jan. 30, 1945 |
| 2,393,979 | Everett  | Feb. 5, 1946  |